CATIONIC PERCENTAGES

Patented June 13, 1950

2,511,228

UNITED STATES PATENT OFFICE 2,511,228

LEAD BORATE GLASS

Kuan-Han Sun, Pittsburgh, Pa., and Thomas E. Callear and Philip T. Scharf, Rochester, N. Y., assignors to Eastman Kodak Company, Rochester, N. Y., a corporation of New Jersey Application March 26, 1947, Serial No. 737,342

6 Claims. (Cl. 106—47)

This invention relates to a borate flint glass. It relates specifically to glasses having little or no silicon, i. e. less than 10 percent silicon, but containing boron, with or without aluminum oxide.

The object of the invention is to provide an optical glass having an index of refraction between 1.6 and 1.7 and having an Abbé value between 40 and 45, with a low blue partial dispersion which is highly desirable in a flint glass for the correction of secondary color in compound lenses.

The nearest prior glasses were aluminum borate flints and the present invention may be considered as a specific improvement of these prior glasses. The object of the present invention compared with these prior borate flints is to obtain greater chemical durability, improved weathering qualities and greater uniformity from batch to batch by having a formula which does not appreciably attack the melting pots. Obviously a formula which attacks the container in which the glass is melted is liable to vary from batch to batch.

A second feature of the present invention is the provision of a technique of melting the glass in a manner which eliminates almost entirely any tendency of the batch to attack the melting pots.

The present invention consists essentially of the addition of beryllium to a lead borate glass. The boron may be partly replaced by aluminum. The lead may be partly replaced by columbium or tantalum. Zinc may also be added to the batch.

In the design of compound lenses it is desirable for the flint and crown glasses to have similar partial dispersion ratios so as to eliminate the so-called secondary spectrum. In general the flint glasses have too high a blue partial dispersion ratio, but there are a few special flint glasses available which have a partial dispersion about .01 lower than ordinary flint glasses of corresponding index of refraction and Abbé value. For example, an ordinary flint glass of index $N_D=1.61$ and Abbé value $V=44$ would have a blue partial dispersion $V_{gF}$ about .57. Glasses of the lead aluminum borate type, however, have a partial dispersion $V_{gF}$ equal to 0.559. However, such glasses are not too durable chemically and are difficult in reproduction with respect to their optical properties, partly because they attack the melting pots and as a consequence have a different composition from batch to batch.

In order to define a useful degree of reduction of partial dispersion ratios some lens designers refer to the Q value of a glass where $$Q = V_{gF} + .00176V$$

Lens designers agree that the Q value of a flint glass should be less than .641 to obtain any marked improvement of secondary spectrum compared to ordinary glasses. In ordinary barium flint glasses, for example, this Q value is about .648 or .649. Glasses according to the present invention have a Q value about .637 or .638.

Throughout the present specification and claims, the usual chemical symbols are used to represent the compounds and since the important point relative to composition is the cationic percentages of the metals present, we have adopted the custom of using fractional numbers of atoms in formulas with the metal component always taken as unity. Thus aluminum oxide is written $AlO_{1.5}$ rather than $Al_2O_3$ which after all is merely convention. In glasses such as the present ones made up entirely of metal oxides, the metals are all cations and the oxygen is the anion. The cationic percentage of any one metal is the number of atoms of that metal expressed as a percentage of the total number of metal atoms present. Cationic percentages are the same whichever convention is used, but the computation is simpler with the formulas in which the metal component is always unity. The specific examples of our invention given below contain some or all of the following components in the batch: $BO_{1.5}$, BeO, ZnO, PbO, $AlO_{1.5}$, $CbO_{2.5}$, and $TaO_{2.5}$.

By using these components, even though the glass properties may vary over a wide range of N and V values, the partial dispersion ratio $V_{gF}$ is in general lower than that of ordinary glasses of the corresponding N and V values. The BeO is the most important since it lowers the blue partial dispersion ratios more than $AlO_{1.5}$ and contributes the higher chemical durability compared to glasses which depended entirely on the aluminum content for lowering partial dispersion ratios. On the other hand as long as sufficient beryllium oxide has been added $AlO_{1.5}$ may be substituted partially for the $BO_{1.5}$ which substitution makes the glasses more durable against moisture attack. We have found surprisingly enough that this $AlO_{1.5}$ does not have any serious effect on the optical properties since these are already controlled by the BeO. The lead may be partly substituted in atomic proportion by columbium or tantalum, but whether this substitution is made or not, the amount of PbO present is relatively small and hence it is possible to make glasses of this type in a platinum vessel. The substitution of platinum for ordinary pot materials eliminates corrosion and solution of the pot and thus leads to greater reproducibility, but in general such a substitution is rendered ineffective if a large amount of lead oxide is included in the glass batch since this material present in large amounts attacks the platinum. Furthermore, according to the present invention the effect of the lead oxide on the platinum can be entirely eliminated if the other components of the glass are all melted down to a liquid (at a relatively high temperature) first. When the lead oxide is present the batch can be easily melted to a liquid at 1150° to 1250° C., but higher temperatures are needed when only the other components are melted first. The lead oxide is then stirred into the high temperature liquid, care being exercised to prevent the lead oxide coming in direct contact with the platinum vessel. The lead oxide dissolves very easily at these high temperatures, and the liquid becomes very fluid. The fluid glass is then stirred to uniformity and poured to a mold preheated to a temperature between 450° and 550° C. A clear colorless glass results. This method of preparing glasses containing lead is useful with all non-silicate glasses such as the phosphate, fluoride, fluophosphate, borate and fluoborate glasses provided the lead content is kept low (below 25 cationic percent).

The following table gives the composition of various examples of batches according to the present invention which produce good quality glass. The percentages are given both with respect to weight (W) and to cationic (C) ratios:

Table I

| Example | $BO_{1.5}$ | | $AlO_{1.5}$ | | PbO | | $CbO_{2.5}$ | | $TaO_{2.5}$ | | BeO | | ZnO | |
|---|---|---|---|---|---|---|---|---|---|---|---|---|---|---|
| | W | C | W | C | W | C | W | C | W | C | W | C | W | C |
| A | 50 | 79.7 | | | 46 | 11.4 | | | | | 4 | 8.9 | | |
| B | 50 | 77.1 | 4 | 4.2 | 42 | 10.1 | | | | | 4 | 8.6 | | |
| C | 47 | 71.4 | 7 | 7.2 | 35 | 8.3 | | | | | 4 | 8.5 | 7 | 4.6 |
| D | 42 | 65.5 | 14 | 15.4 | 36 | 9.0 | | | | | 3 | 6.7 | 5 | 3.4 |
| E | 48 | 70.6 | 8 | 8.0 | 27 | 6.2 | 5 | 1.9 | | | 4 | 8.9 | 8 | 5.0 |
| F | 47 | 71.3 | 7 | 7.3 | 25 | 5.9 | | | 10 | 2.4 | 4 | 8.5 | 7 | 4.6 |
| G | 41 | 64.9 | 10 | 10.8 | 35 | 8.6 | | | | | 4 | 8.8 | 10 | 6.8 |
| H | 31 | 52.8 | 15 | 17.5 | 35 | 9.3 | | | | | 4 | 9.5 | 15 | 10.9 |

In the above table examples A, C and F have been found to have the most desirable optical properties, which are given in the following table along with the index and Abbé value for example B which is included merely to indicate how the index and the V value may be varied by varying the ratio of lead to boron.

Table II

| Example | $N_D$ | V | $V_{oF}$ | Q |
|---|---|---|---|---|
| A | 1.6496 | 41.5 | 0.565 | .638 |
| B | 1.623 | 43 | | |
| C | 1.6308 | 44.1 | 0.559 | .637 |
| F | 1.6384 | 43.2 | 0.562 | .638 |

Figure 1:
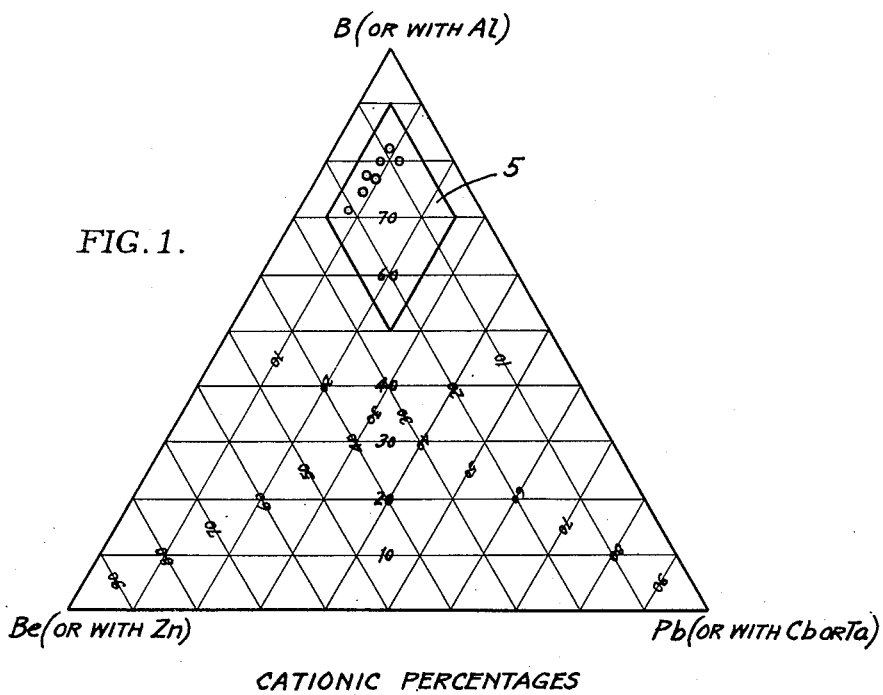
Fig. 1 shows the cationic percentages of glasses according to the present invention.

In Fig. 1 the percentages of lead, beryllium and boron are represented on a triangular diagram. These three components are present in all glasses according to the present invention although they may be partly substituted as shown in Table I above. Therefore, in Fig. 1 any aluminum present is included with the boron, zinc is included with the beryllium, and columbium or tantalum is included with the lead content. The diamond shaped area 5 represents the most preferred composition for glasses according to the present invention.

Figure 2:
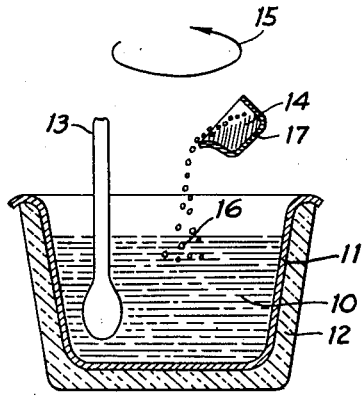
Fig. 2 illustrates the preferred method of making such glasses.

In Fig. 2 a glass according to the invention is melted at high temperature to a liquid 10 in a platinum crucible 11 supported by a clay pot 12. All of the constituents except the lead oxide is first melted to form the liquid 10 and then lead oxide 14 from a container 17 is poured into the middle of the solution 10 while the solution is stirred by a stirring rod 13 moving with a circular motion indicated by the arrow 15. The temperature of the liquid 10 is higher than that at which the complete batch melts and, therefore, the crystals of lead oxide are rapidly dissolved in the neighborhood indicated at 16 before any of the crystals reach the edge of the solution so as to come in contact with the platinum crucible 11.

According to the invention the glass is made from a batch containing the oxides of beryllium (Be), lead (Pb), boron (B), zinc (Zn), aluminum (Al), columbium (Cb) or tantalum (Ta) substantially free of silicon (Si). The cationic percentage of beryllium should be between 5 percent and 25 percent, of lead between 5 percent and 25 percent, and of boron between 50 percent and 90 percent. This corresponds to the area 5 in Fig. 1 when only these three components are present. A small amount of zinc may be added. The total percentage of zinc oxide by weight being between 0 percent and 20 percent. When zinc is added, in order to have any appreciable effect, its cationic percentage should be greater than 2 percent, but when added to the cationic percentage of beryllium the total should still be less than the 25 percent limit specified above for beryllium.

As pointed out above the beryllium provides the low blue dispersion obtained by the present invention so that aluminum is not needed for this purpose. In fact the addition of aluminum does not appreciably effect this factor further. However, $AlO_{1.5}$ may be added in a weight percentage anywhere from 0 percent to 20 percent. When it is added, the cationic percentage of aluminum should be between 2 and 20 percent, and since it acts in this particular glass system as a substitute for boron (giving greater durability against moisture attack), the cationic percentage of aluminum when added to that of boron should still be less than 90 percent which is the upper limit specified above for boron alone.

Although only a relatively small cationic percentage of lead is used, parts of this constituent may advantageously be replaced by columbium or tantalum. The weight percentage of $CbO_{2.5}$ or $TaO_{2.5}$ should be between 0 percent and 15 percent. When such a substitution is made, the cationic percentage of columbium or tantalum should be between 1 percent and 5 percent to have any noticeable effect. Since either of these materials is a substitute for the lead, the cationic percentage of the lead substitute added to the cationic percentage of lead itself should still be less than 25 percent, the upper limit for lead.

It is to be understood that the present invention is not limited to these specific preferred examples but is of the scope of the appended claims.

We claim:

1. An optical borate glass having an index of refraction between 1.6 and 1.7 and an Abbé value between 40 and 45, consisting of the heat reaction product of a batch of oxides in which there is a cationic percentage of beryllium between 5 percent and 25 percent, a cationic percentage of lead between 5 percent and 25 percent, a cationic percentage of boron between 50 percent and 90 percent not over 10 per cent being silicon and the remaining oxides being compatible in the glass composition.

2. A glass according to claim 1 in which there is also a cationic percentage of zinc greater than 2 percent and, added to the cationic percentage of beryllium, less than 25 percent.

3. A glass according to claim 1 in which there is also a cationic percentage of aluminum between 2 percent and 20 percent and, added to the cationic percentage of boron, less than 90 percent.

4. A borate optical glass consisting of the heat reaction product of a batch containing between 30 percent and 60 percent by weight of boron oxide and oxides of the following metals with the percentages by weight as specified: beryllium between 2 percent and 10 percent, zinc not over 20 percent, lead between 20 percent and 50 percent, columbium not over 15 percent, tantalum not over 15 percent, aluminum not over 20 percent.

5. A glass according to claim 1, in which columbium oxide replaces lead oxide to the extent of from 1 to 5 per cent of the whole batch.

6. A glass according to claim 1, in which tantalum oxide replaces lead oxide to the extent of from 1 to 5 per cent of the whole batch.

KUAN-HAN SUN.
THOMAS E. CALLEAR.
PHILIP T. SCHARF.

REFERENCES CITED

The following references are of record in the file of this patent:

UNITED STATES PATENTS

| Number | Name | Date |
|---|---|---|
| 2,294,373 | Batchell | Sept. 1, 1942 |
| 2,406,580 | Bastick et al. | Aug. 27, 1946 |

FOREIGN PATENTS

| Number | Country | Date |
|---|---|---|
| 388,118 | Great Britain | 1933 |